US009291933B2

(12) United States Patent
Hirano

(10) Patent No.: US 9,291,933 B2
(45) Date of Patent: Mar. 22, 2016

(54) IMAGE FORMING APPARATUS, CONTROL APPARATUS, AND IMAGE FORMING SYSTEM

(71) Applicant: Konica Minolta, Inc., Chiyoda-ku (JP)

(72) Inventor: Sachiko Hirano, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/313,077

(22) Filed: Jun. 24, 2014

(65) Prior Publication Data

US 2014/0376007 A1 Dec. 25, 2014

(30) Foreign Application Priority Data

Jun. 24, 2013 (JP) .................................. 2013-131271

(51) Int. Cl.
| | |
|---|---|
| *G03F 3/08* | (2006.01) |
| *G03G 15/01* | (2006.01) |
| *G03G 15/00* | (2006.01) |
| *G06K 15/02* | (2006.01) |
| *H04N 1/00* | (2006.01) |
| *G06F 3/12* | (2006.01) |
| *B41J 29/393* | (2006.01) |

(52) U.S. Cl.
CPC ........ *G03G 15/0142* (2013.01); *G03G 15/5062* (2013.01); *B41J 29/393* (2013.01); *G03G 2215/0164* (2013.01); *G06F 3/1211* (2013.01); *G06F 3/1285* (2013.01); *G06K 15/02* (2013.01); *H04N 1/00031* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,057,867 | A  * | 10/1991 | Ishigaki et al. | 399/43 |
| 2004/0234286 | A1 | 11/2004 | Takahashi | |
| 2005/0117927 | A1* | 6/2005 | Tanaka et al. | 399/49 |
| 2005/0190386 | A1 | 9/2005 | Zaima | |
| 2005/0207768 | A1* | 9/2005 | Suzuki | 399/49 |
| 2013/0251388 | A1* | 9/2013 | Tanaka | 399/49 |

FOREIGN PATENT DOCUMENTS

| | | | |
|---|---|---|---|
| JP | 56032153 | A | 4/1981 |
| JP | 61100768 | A | 5/1986 |
| JP | 02058069 | A | 2/1990 |
| JP | 2004-347666 | A | 12/2004 |
| JP | 2005265969 | A | 9/2005 |
| JP | 3854965 | B2 | 12/2006 |

OTHER PUBLICATIONS

Notification of Reasons for Refusal issued on Jun. 9, 2015 in corresponding Japanese Application No. 2013-131271, with full English translation (17 pages).

* cited by examiner

*Primary Examiner* — Miya J Cato
(74) *Attorney, Agent, or Firm* — Buchanan Ingersoll & Rooney PC

(57) ABSTRACT

An image forming apparatus including: an acquisition unit for independently acquiring image correction information on every page, the image correction information being independently preset for every page on which an image is to be formed; and a control unit for correcting an image forming condition for every page based on the image correction information acquired by the acquisition unit and controlling the image forming apparatus to form the image on a sheet based on the corrected image forming condition.

13 Claims, 8 Drawing Sheets

FIG.5

| QUIESCENT TIME | TYPE AND THICKNESS OF SHEET | SHEET SIZE | "CONDITIONS" |
|---|---|---|---|
| A | ALL | ALL | |
| B | A | A | X |
| C | A | B | Y |
| C | B | A | Y |
| C | B | B | Z |

100, 110, 120, 130

QUIESCENT TIME⋯A: LESS THAN 15 SECONDS, B: 15 SECONDS TO LESS THAN 1 MINUTE, C:1 MINUTE TO LESS THAN 3 MINUTES
TYPE AND THICKNESS OF SHEET⋯A:CARDBOARD, B:MEDIUM THICK COATED PAPER, C:MEDIUM THICK PLAIN PAPER
SHEET SIZE⋯A: LESS THAN B5, B:B5 TO LESS THAN A4, C:A4 TO LESS THAN B4

IMAGE FORMING APPARATUS, CONTROL APPARATUS, AND IMAGE FORMING SYSTEM

BACKGROUND OF THE INVENTION

1. Field of the Invention

The present invention relates to an image forming apparatus having an image correcting function, a control apparatus for controlling the image forming apparatus, and an image forming system including these apparatuses.

2. Description of Related Art

In recent years, image forming apparatuses, such as printers, have been requested to provide higher image quality. Various image correction techniques have therefore been studied in order to stabilize the image output.

In particular, a large variation is found in quality of the images immediately after the restart of the quiescent image formation apparatus. Such a variation should be avoided.

Japanese Patent No. 3854965 (hereinafter referred to as Patent Literature 1) discloses a technique for detecting an image formed on the first sheet after power-up to determine a correction value for an image forming condition, and applying the correction value to image formation on the first sheet after the next power-up.

Japanese Patent Application Laid Open Publication No. 2004-347666 (hereinafter referred to as Patent Literature 2) discloses a technique for detecting a toner image formed on a photoreceptor, acquiring an optimal development condition based on the detection result, correcting the development condition in consideration of a quiescent time period and humidity information at the start of the next image formation, and applying the corrected development condition to the next image formation.

In particular, the quality of the images formed after the restart of the quiescent image forming apparatus is unstable before the stabilization of the image forming apparatus. This instability causes a variation in output of image formation on every sheet. This variation in image quality on every sheet changes with time. More specifically, the degree of variation in image quality between the first sheet and the second sheet is different from that between the second sheet and the third sheet.

The quality of the images formed after the restart of the image forming therefore cannot be readily stabilized before the stabilization of the image forming apparatus.

Both Patent Literatures 1 and 2 involve a technique for correcting an image formed on the second or later sheet after the restart of image formation on the basis of the detection result of the last image formation. In other words, after the restart of the image formation, an image to be formed on the second sheet is processed with a correction value from the detection result of the image on the first sheet, and an image to be formed on the third sheet is processed with a correction value from the detection result of the image on the second sheet.

Unfortunately, as described above, a large variation is found in quality of the images formed on every sheet after the restart of the quiescent image forming apparatus. This variation hinders the production of a desired image corrected on the basis of the detection result of the last image formation.

SUMMARY OF THE INVENTION

An object of the present invention, which has been made in consideration of the above problems, is to provide an image forming apparatus for correcting an image forming condition to provide desired image output, a control apparatus for controlling the image forming apparatus, and an image forming system including these apparatuses.

In order to achieve the above object, according to one aspect of the present invention, there is provided an image forming apparatus including: an acquisition unit for independently acquiring image correction information on every page, the image correction information being independently preset for every page on which an image is to be formed; and a control unit for correcting an image forming condition for every page based on the image correction information acquired by the acquisition unit and controlling the image forming apparatus to form the image on a sheet based on the corrected image forming condition.

Preferably, the image forming apparatus further includes a quiescent state determining unit for determining whether the image forming apparatus is in a quiescent state before formation of the image on the sheet, and the control unit corrects the image forming condition based on the image correction information only when the quiescent state determining unit determines that the image forming apparatus is in the quiescent state.

Preferably, the image forming apparatus further includes a steady state determining unit for determining whether the image forming apparatus reaches a steady state where a difference in image forming result between pages is equal to or less than a predetermined value, and the control unit corrects the image forming condition based on the image correction information before the steady state determining unit determines that the image forming apparatus reaches the steady state.

Preferably, in the image forming apparatus, the control unit corrects the image forming condition based on different information from the image correction information after the steady state determining unit determines that the image forming apparatus reaches the steady state.

Preferably, the image forming apparatus further includes a quiescent period measuring unit for measuring a period during which the image forming apparatus is in a quiescent state; and a determination unit for determining an execution condition for a job according to the period measured by the quiescent period measuring unit, and the control unit corrects the image forming condition based on the image correction information according to the period measured by the quiescent period measuring unit.

Preferably, the image forming apparatus further includes a quiescent period measuring unit for measuring a period during which the image forming apparatus is in a quiescent state; and a determination unit for determining an execution condition for a job according to the period measured by the quiescent period measuring unit, and the control unit creates the image correction information according to the execution condition for the job determined by the determination unit; and the acquisition unit acquires the image correction information created by the control unit.

Preferably, in the image forming apparatus, the determination unit determines the execution condition for the job according to job information in addition to the measured period.

Preferably, in the image forming apparatus, the control unit corrects a pixel value included in image data in order to correct the image forming condition based on the image correction information.

Preferably, the image forming apparatus further includes a colorimetric section for performing colorimetry for the image formed on the sheet, and the control unit creates the image correction information based on a colorimetric result from the colorimetric section; and the acquisition unit acquires the image correction information created by the control unit.

Preferably, the image forming apparatus further includes a colorimetric section for performing colorimetry for the image formed on the sheet, and the control unit updates the image correction information based on a colorimetric result from the colorimetry section.

BRIEF DESCRIPTION OF THE DRAWINGS

The above and other objects, advantages and features of the present invention will become more fully understood from the detailed description given hereinbelow and the appended drawings which are given byway of illustration only, and thus are not intended as a definition of the limits of the present invention, and wherein:

FIG. 5 illustrates exemplary condition determination for a job in the embodiment;

DETAILED DESCRIPTION OF THE PREFERRED EMBODIMENT

Figure 1:
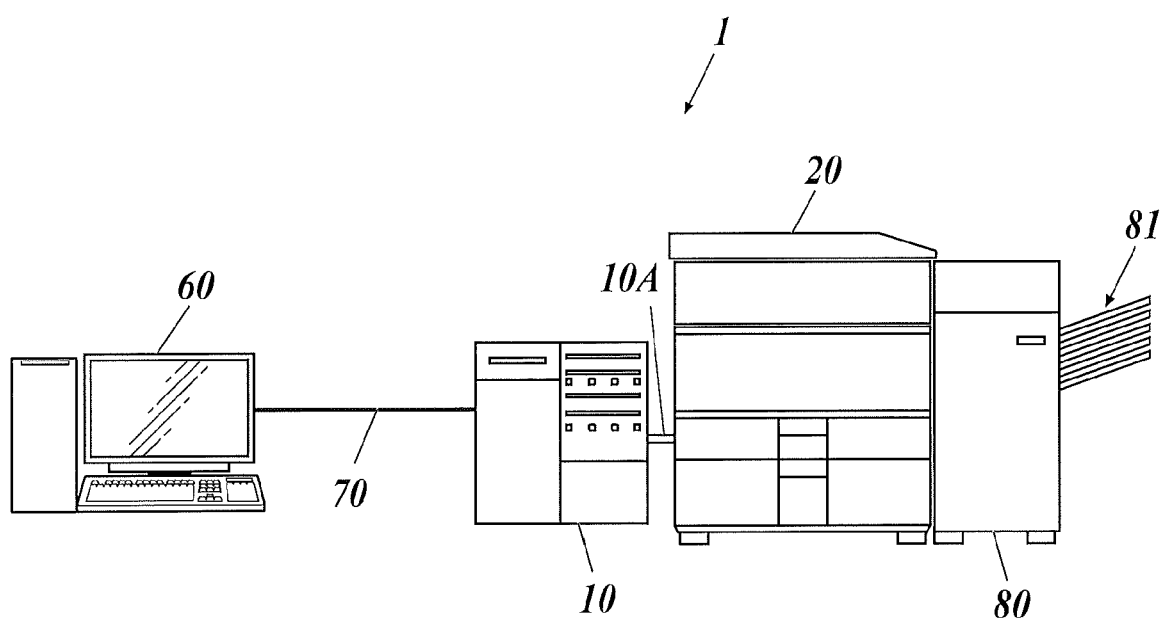
FIG. 1 illustrates the configuration of an image forming system in an embodiment.

An embodiment of the present invention will now be described with reference to the accompanying drawings. FIG. 1 illustrates an image forming system in the present embodiment. The image forming system 1 includes a printer controller 10, an image forming apparatus 20, a terminal 60, and a colorimeter 80.

The printer controller 10 is connected to the image forming apparatus 20 through a bus 10A, exchanges information with the image forming apparatus 20, and controls the operation of the image forming apparatus 20.

The image forming apparatus 20 forms an image on a sheet through, for example, an electrophotographic process.

The terminal 60 is connected to the printer controller 10 through the network 70. The terminal 60 transmits image data for an image to be formed by the image forming apparatus 20, to the printer controller 10. The terminal 60 generally includes a printer driver so that various settings, such as a layout of image formation, are available.

The colorimeter 80 is in-line connected to the image forming apparatus 20, receives a sheet having an image formed in the image forming apparatus 20, reads the image formed on the sheet, and ejects the sheet to a tray 81. The read image data is transmitted to the printer controller 10. The printer controller 10 utilizes the transmitted image data for correction described below.

Figure 2:
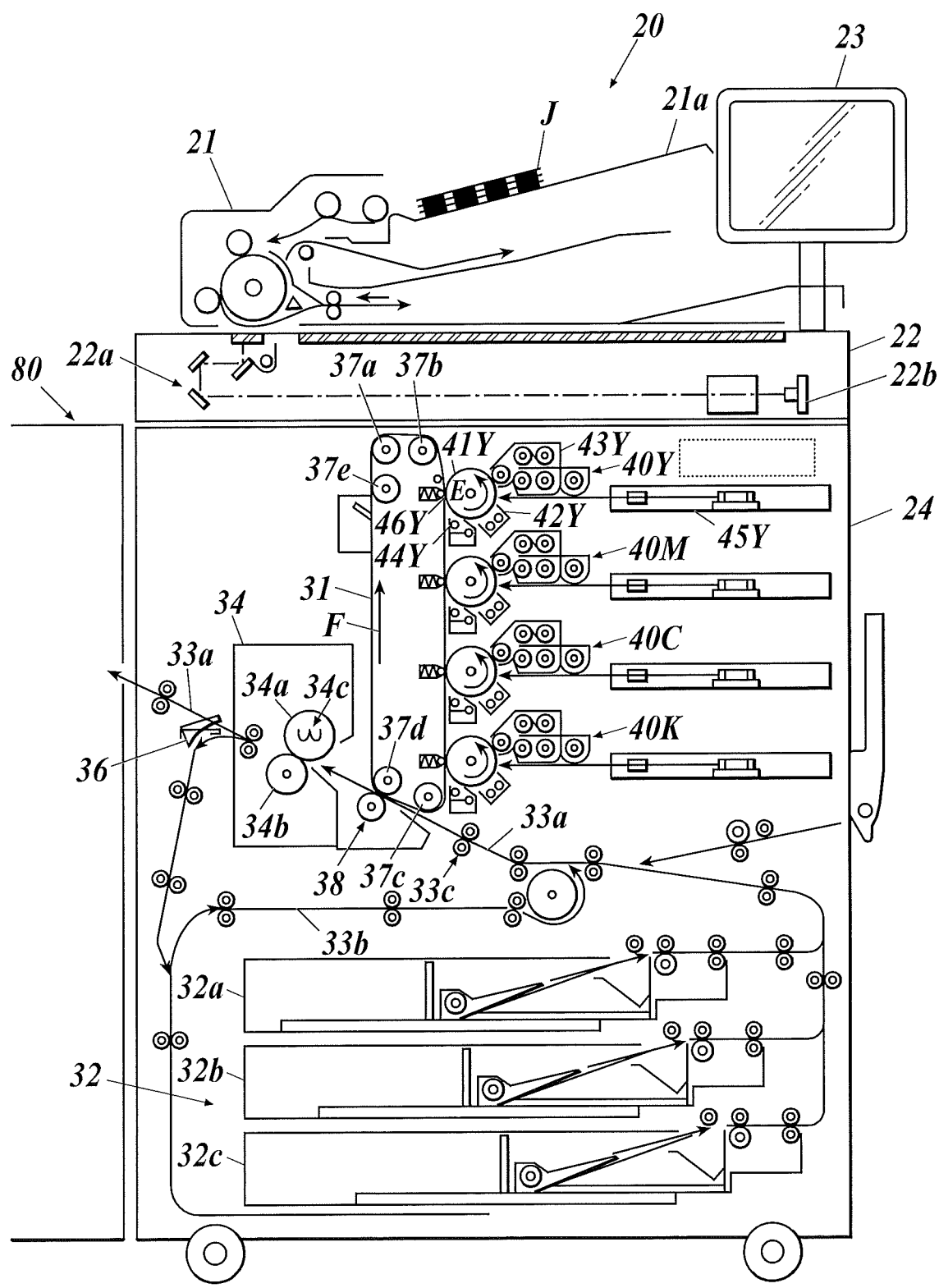
FIG. 2 illustrates the configuration of an image forming apparatus in an embodiment.

FIG. 2 is a sectional view illustrating the configuration of the image forming apparatus 20. In the present embodiment, the image forming apparatus 20 forms an image on a sheet through an electrophotographic process.

The image forming apparatus 20 is a so-called tandem image forming apparatus, which can form color images, and includes, for example, a scanner 22, a printer 24, a sheet feeder 32, and an operation display 23. The following embodiments include the color image forming apparatus, but the present invention is also applicable to an image forming apparatus that can form only monochrome images.

The scanner 22 includes, for example, an automatic document feeder 21, an optical system 22a, and a CCD image sensor 22b.

The printer 24 includes, for example, image forming units 40Y, 40M, 40C, and 40K respectively form yellow, magenta, cyan, and black toner images, an intermediate transfer belt 31 on which the toner images formed by the image forming units are transferred, a secondary transferring unit 38 transferring the toner images on the intermediate transfer belt 31 onto a sheet, and a fixing unit 34 fixing the transferred toner images onto the sheet.

The sheet feeder 32 includes sheet feeding trays 32a to 32c. The sheet feeder 32 feeds appropriate sheets at an appropriate timing.

The operation display 23 includes, for example, a touch panel screen. A user can touch icons appearing on the screen with a finger or a pen to determine the specifications of image formation or to give an instruction to start the image formation.

The outline of each component in the image forming apparatus 20 has been described above. An operational sequence of an embodiment will now be described which includes the color image forming apparatus 20.

In response to an instruction to start image formation from the terminal 60 in FIG. 1 or the operation display 23, a document J placed on a document holder 21a of the automatic document feeder 21 is conveyed to a document reader. Light emitted from a light source (not illustrated) is reflected by the document and is then read through the optical system 22a by the CCD image sensor 22b.

The image signals read by the CCD image sensor 22b are subjected to various image processes. The image forming units 40Y to 40K form respective color toner images on the basis of the processed image signals.

The image forming unit 40Y forming a yellow toner image includes a photoreceptor drum 41Y, a charging section 42Y, an exposure section 45Y, a developing section 43Y, and a cleaning section 44Y. In order to form an image, the photoreceptor drum 41Y is rotated in the direction of an arrow E in FIG. 1 by driving means (not illustrated) so that the surface of the photoreceptor drum 41Y is uniformly charged by the charging section 42Y. The exposure section 45Y transmits laser light to the uniformly charged photoreceptor drum 41Y on the basis of the image signals to form an electrostatic latent image corresponding to a yellow image.

Next, the developing section 43Y develops the electrostatic latent image on the photoreceptor drum 41Y to form a yellow toner image on the photoreceptor drum 41Y. The formed toner image is electrostatically transferred onto the intermediate transfer belt 31 by a transfer voltage applied to a primary transfer roller 46Y.

The toner not transferred onto the intermediate transfer belt 31 is remained on the surface of the photoreceptor drum 41Y and is removed by the cleaning section 44Y for subsequent toner image formation.

The magenta image forming unit 40M, cyan image forming unit 40C, and black image forming unit 40K each have the same configuration as that of the yellow image forming unit 40Y. Redundant descriptions thereon will thus be omitted.

The intermediate transfer belt 31 is an endless belt wound around rollers 37a to 37e and is rotatably supported by the rollers. The intermediate transfer belt 31 is generally composed of resin (for example, polyimide) or a resin material having an elastic layer thereon. In order to form an image, the intermediate transfer belt 31 is rotated in the direction of an arrow F in FIG. 1 in conjunction with the rotation of the drive roller 37a.

In order to form a color image, the primary transfer rollers for the respective colors electrostatically transfer the respective color toner images onto the intermediate transfer belt 31 in the order from the yellow toner image such that the toner images coincide with one another. This process forms a color toner image corresponding to a document image on the intermediate transfer belt 31.

Meanwhile, a sheet fed from any one of the sheet feeding trays 32a to 32c is conveyed through a conveyance path 33a to paired resist rollers 33c. The sheet comes into contact with the nip of the paired resist rollers 33c so that meandering of the sheet in the conveyance direction is corrected. The sheet is then conveyed to the secondary transferring unit 38 in synchronization with the transfer of the color toner image on the intermediate transfer belt 31.

The secondary transferring unit 38 electrostatically transfers the color toner image on the intermediate transfer belt 31 onto the sheet. The sheet with the transferred color toner image is conveyed to the fixing unit 34 to fix the toner image.

The fixing unit 34 includes, for example, a fixing roller 34a and a pressure roller 34b. The fixing roller 34a is provided with a heater 34c. The fixing roller 34a and the pressure roller 34b apply heat and pressure on the sheet to fix the toner image on the sheet.

The sheet with the fixed toner image is conveyed through the conveyance path 33a to the colorimeter 80.

In order to form images on both surfaces of a sheet, the fixing unit 34 fixes a toner image on one surface of the sheet, conveys the sheet through a bifurcate section 36 to a reversal path 33b, and reverses the front and back ends of the sheet in the conveyance direction. The reversed sheet is conveyed through the reversal path 33b to the paired resist rollers 33c so that meandering of the sheet in the conveyance direction is corrected.

The secondary transferring unit 38 then transfers a color toner image corresponding to an image formed on the other surface of the sheet as described above. The fixing unit 34 fixes the color toner image on the other surface of the sheet, which is then sent to the colorimeter 80.

Figure 3:
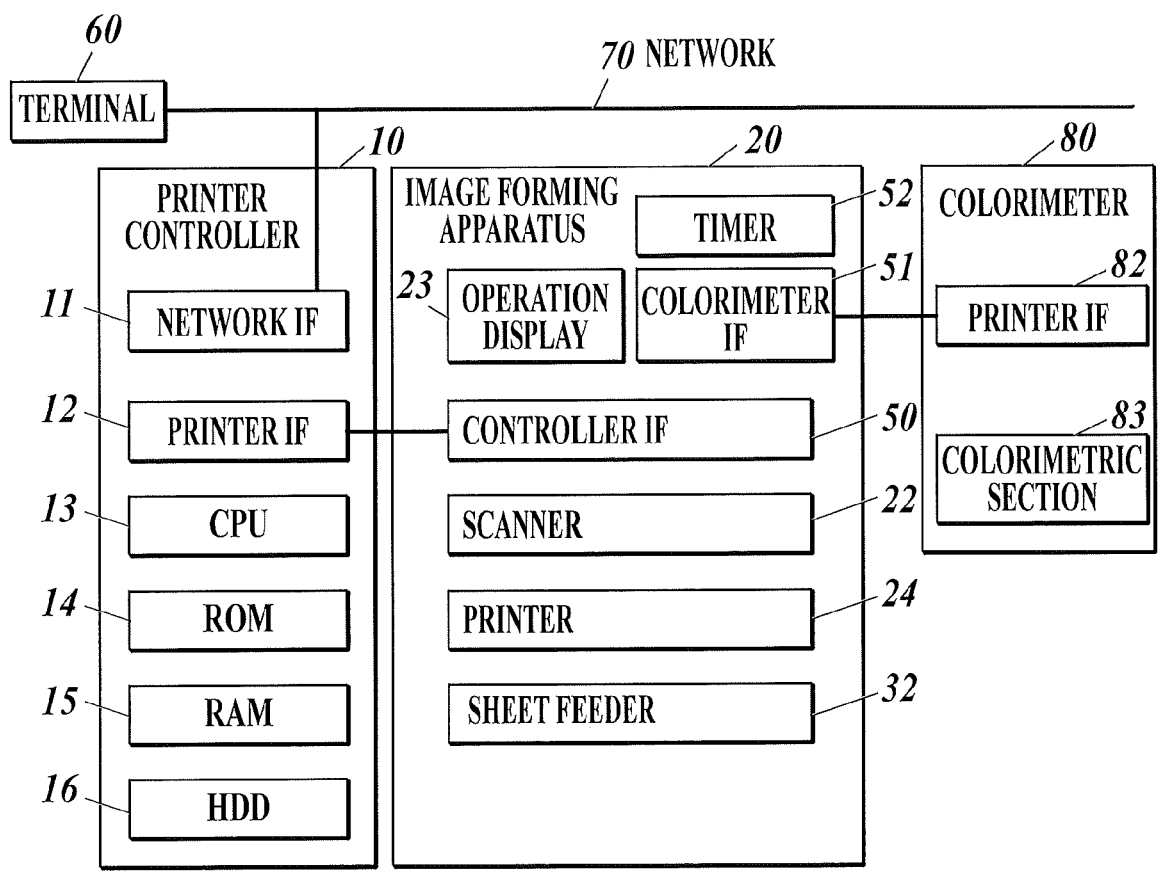
FIG. 3 illustrates the electric configuration of the image forming system in the embodiment.

FIG. 3 is a block diagram illustrating the electric configuration of the image forming system in the present embodiment. The above-described components are designated with the same reference numerals as those in FIGS. 1 and 2.

The printer controller 10 includes, for example, a network IF 11, a printer IF 12, a CPU 13, a ROM 14, a RAM 15, and an HDD 16.

The printer controller 10 exchanges information with the external terminal 60 through the network IF 11. The printer controller 10 also exchanges information with the image forming apparatus 20 through the printer IF 12.

The CPU 13 generates signals for controlling operations of the image forming apparatus 20 based on, for example, information inputted through the network IF 11 and the printer IF 12. The CPU 13 also generates signals for causing the terminal 60 to operate, for example, display predetermined contents.

The ROM 14 stores, for example, various programs. The RAM 15 is a region for temporarily storing data for various processes. The CPU 13 reads a program stored in the ROM 14 and expands the program in the RAM 15 to execute various controls.

The HDD 16 stores various pieces of data, such as image data and correction data described below.

In response to the image data from the terminal 60, the CPU 13 processes the image data by, for example, rasterizing, and transmits the processed data to the image forming apparatus 20. The CPU 13 also corrects output conditions to stabilize image output. The correction of the output conditions will be explained below.

The image forming apparatus 20 includes the scanner 22, the operation display 23, the printer 24, the sheet feeder 32, a controller IF 50, a colorimeter IF 51, and a timer 52.

The image forming apparatus 20 exchanges information with the printer controller 10 through the controller IF 50. The image forming apparatus 20 also exchanges information with the colorimeter 80 through the colorimeter IF 51. The components of the image forming apparatus 20 operate in response to signals from the CPU 13.

The timer 52 measures quiescent time (explained below) of the image forming apparatus 20.

The colorimeter 80 includes a printer IF 82 and a colorimetric section 83. The colorimeter 80 exchanges information with the image forming apparatus 20 through the printer IF 82.

The colorimetric section 83 detects an image formed on the sheet. An exemplary colorimetric section 83 which includes a light emitter emitting light to an image and a light receiving unit receiving the light reflected from the image detects the density of the image on the basis of the output from the light receiving unit. The colorimetric section can have any configuration other than the configuration described above.

Operations, such as image correction, of the image forming system 1 according to the present invention will now be explained.

In the present embodiment, when the operation restarts from the quiescent state of an image forming operation, current image forming conditions for every image from the first page to the predetermined number of the page at the operation are corrected on the basis of correction data preset for every page, for the formation of the images.

Figure 4:
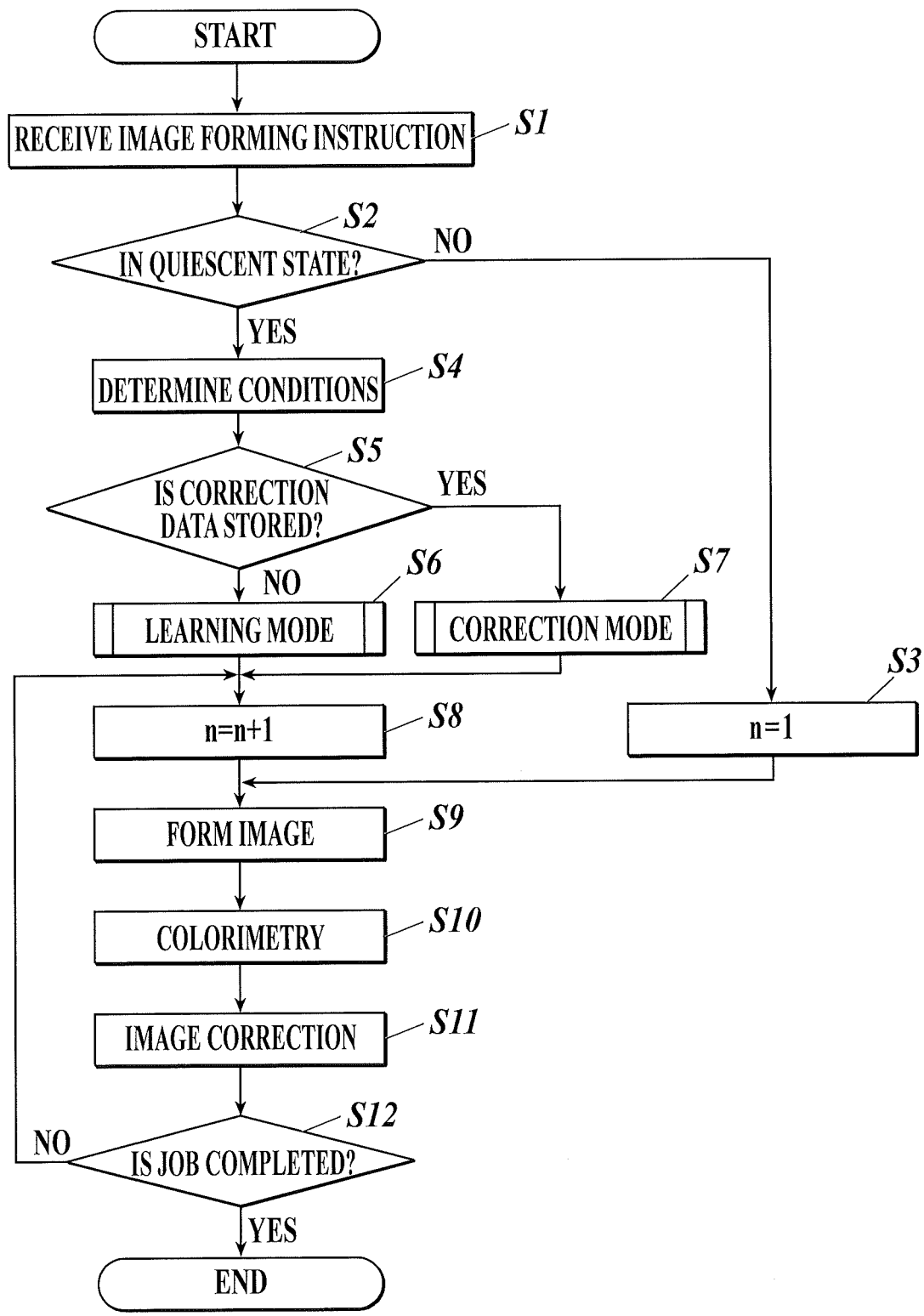
FIG. 4 is a flow chart illustrating an exemplary control procedure in an image forming operation of the embodiment.

FIG. 4 is a flow chart illustrating a control procedure by the CPU 13 in the present embodiment. The procedure illustrated in FIG. 4 is executed after the CPU 13 reads a control program stored in the ROM 14 and expands the control program in the RAM 15.

The CPU 13 first receives an image forming instruction from the terminal 60 or the operation display 23 through the network IF 11 or the printer IF 12 (Step S1). Upon the reception of the image forming instruction, the CPU 13 determines whether the image forming apparatus 20 is in a quiescent state (Step S2). Step S2 measures the time from the last ejection of a sheet on the tray 81 in the previous job to the reception of an instruction to start image formation for the subsequent job by the timer 52, and determines the quiescent state of the image forming apparatus 20 depending on whether the measured time reaches predetermined time. In the present embodiment, the predetermined time is 15 seconds, and a quiescent state is determined when the lapsed time reaches 15 seconds. Any appropriate value can be set as the predetermined time.

If Step S2 determines that the image forming apparatus 20 is not in a quiescent state (Step S2: No), Step S3 sets n=1, and an image is formed on an n-th page of a job based on an image forming instruction (Step S9). In this case, the image correction for each page described below is not executed.

The image forming apparatus 20 not in a quiescent state does not cause a large variation in the image quality on respective pages. In such a case, an image for a new job is therefore formed without the image correction for each page.

If Step S2 determines that the image forming apparatus 20 is in a quiescent state (Step S2: Yes), conditions of a job based on an image forming instruction are determined (Step S4). As illustrated in FIG. 5, Step S4 determines the conditions on the basis of the lapsed time acquired in Step S2, sheet type and sheet thickness, and sheet size.

FIG. 5 illustrates exemplary condition determination. In the present embodiment, the conditions for a job are determined on the basis of the quiescent time 100 of the image forming apparatus 20 before the reception of an image forming instruction, type and thickness 110 and size 120 of a sheet on which an image is formed. Depending on the combinations of the quiescent time 100, the sheet type and thickness 110, and the sheet size 120, the conditions 130 for jobs are predetermined. The table illustrated in FIG. 5 is preliminarily stored in the HDD 16.

The quiescent time 100 is measured by the timer 52 illustrated in FIG. 3. The timer 52 starts the measurement if the image forming apparatus 20 receives signals indicating that the last sheet is ejected to the tray 81 in the previous job, and completes the measurement if the image forming apparatus 20 receives an instruction to start image formation in a subsequent job. The quiescent time from the start to the completion of the measurement is used to determine the condition.

In FIG. 5, if the quiescent time 100 is equal to or more than 15 seconds and less than one minute, the condition 130 is set to be "X".

If the quiescent time 100 is equal to or more than one minute and less than three minutes, the condition is set to be "Y" or "Z" depending on the combination of the type and thickness 110 and the size 120 of a sheet.

The table in FIG. 5 is a mere example and may include any other appropriate conditions. FIG. 5 is based on the type and thickness 110 and the size 120 of the sheet. This is because the surface temperature of the fixing roller 34a or the pressure roller 34b of the fixing unit 34 varies depending the type or size of a sheet, leading to a variation in quality of the fixed image. These conditions, however, may not be essential. Alternatively, any other appropriate conditions, such as the temperature in the image forming apparatus 20 and the rate of printing, may be added.

The conditions 130 may be determined from more than three items. Furthermore, the conditions 130 may appropriately be updated on the basis of, for example, the input to the operation display 23 and may further include additional conditions.

Step S5 determines whether image correction data is stored which corresponds to the determined condition. If the corresponding data is not stored (Step S5: No), a learning mode is executed (Step S6).

If the image correction data is stored which corresponds to the determined condition (Step S5: Yes), a correction mode is executed (Step S7). The learning and correction modes are maintained until the image forming apparatus 20 reaches a steady state. The learning and correction mode will be explained below.

If the learning mode or correction mode is completed, Step S8 sets n=n+1 to form an image on an n-th page (Step S9). The sheet of the n-th page with the image formed thereon is then conveyed to the colorimeter 80 and is subjected to colorimetry in the colorimetric section 83 (Step S10).

After the colorimetry, image correction data is calculated (Step S11). More specifically, on the basis of the colorimetry result in Step S10, the determination of the image forming conditions for the next page or the change in pixel value of the image data on the next page are executed for an appropriate image formation on the next page.

Step S12 determines whether the job is completed. If it is not completed (Step S12: No), the process returns to Step S8 and sets n=n+1. Step S9 then forms an image using the image correction data calculated in Step S11.

If the job is completed (Step S12: Yes), the process is terminated. The present embodiment performs the learning mode or the correction mode until the image forming apparatus 20 reaches a steady state, and executes image correction for the next page based on the result of the last image colorimetry after the image forming apparatus 20 reaches a steady state.

Figure 6:
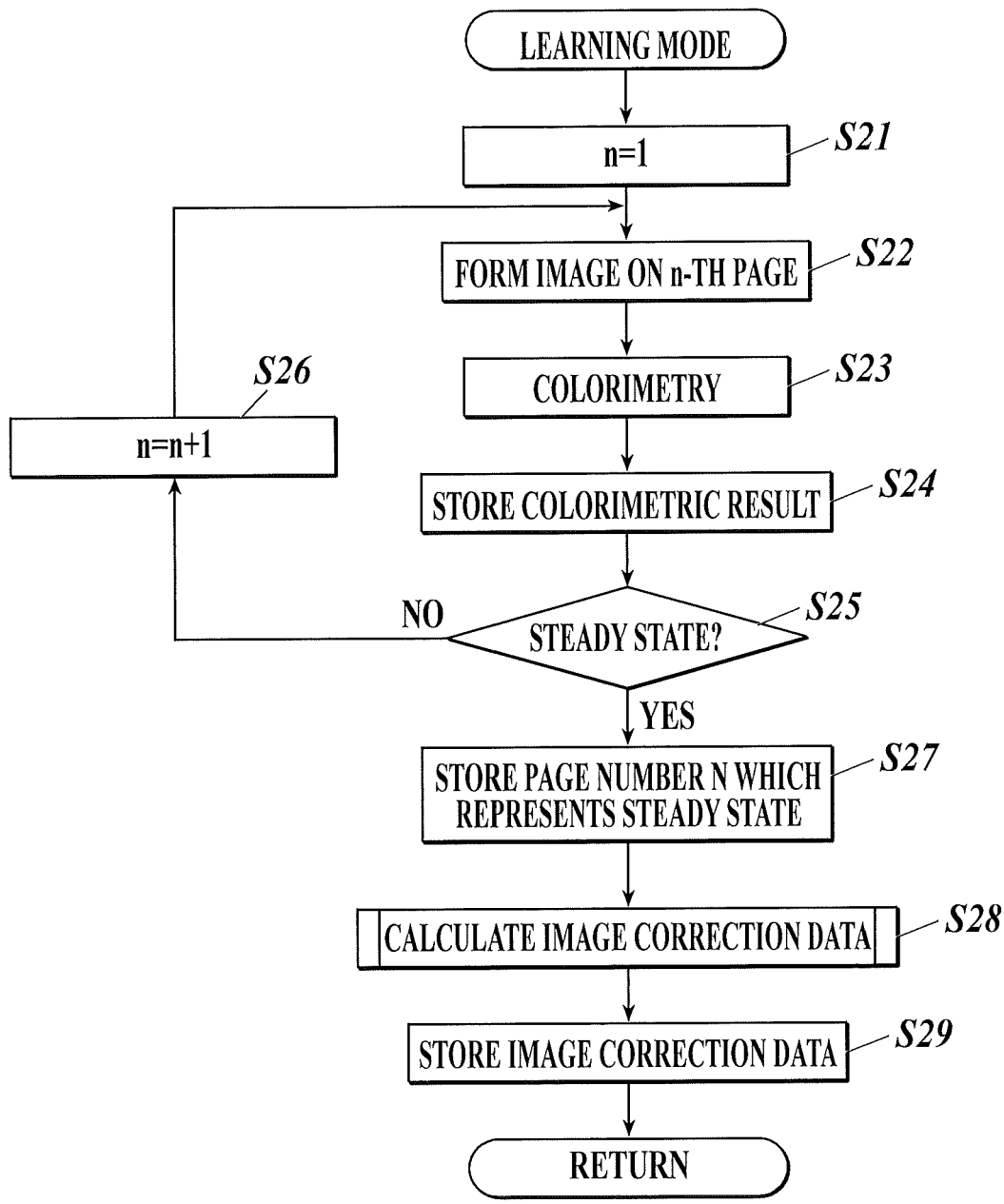
FIG. 6 is a flow chart illustrating an exemplary control procedure in a learning mode of the embodiment.

FIG. 6 is a flow chart illustrating a control procedure of the learning mode illustrated in Step S6 in FIG. 4. In the present embodiment, if no image correction data corresponding to conditions for a job is stored, the learning mode is executed to create and store image correction data corresponding to the conditions.

Upon the start of the learning mode, n=1 is first set (Step S21) so that the image forming apparatus 20 forms an image on an n-th page (Step S22). A sheet having an image formed thereon is conveyed to the colorimeter 80 and is subjected to colorimetry in the colorimetric section 83 (Step S23). In the present embodiment, the image forming apparatus 20 forms a patch image for colorimetry in a margin of each sheet. The colorimetric section 83 then performs colorimetry for the patch image. The colorimetric result for the n-th page is stored in the RAM 15 or the HDD 16 (Step S24). Alternatively, an image formed in an image region may be subjected to the colorimetry without formation of the patch image.

Step S25 then determines whether the image forming apparatus 20 reaches a steady state. The image forming apparatus 20 is determined to be in the steady state if the difference between the colorimetric results at portions having the same pixel value in n-th and (n−1)-th pages is less than a predetermined value over five continuous pages, for example. If the difference is not less than the predetermined value over five continuous pages, the process determines that the image forming apparatus 20 is not in the steady state (Step S25: No), sets n=n+1 (Step S26), and returns to Step S22.

If the process determines that the image forming apparatus 20 reaches a steady state (Step S25: Yes), a page number N is stored which represents the steady state (Step S27). In the present embodiment, if the difference between the colorimetric results is less than the predetermined value over five continuous pages, the third of the five pages is stored as a page N in the steady state.

Image correction data is then calculated (Step S28). Step S28 calculates correction data based on the colorimetric data on the N-th page in the steady state so that the output for the respective pages (from the first page to the (N−1)-th page) in the non-steady state is corrected to be equal to the output on the N-th page using the correction data. The calculation of the image correction data will be described in detail below.

The calculated image correction data is stored in the HDD 16 as image correction data corresponding to the conditions determined in Step S4 of FIG. 4 (Step S29). The process completes the storing and then goes to Step S8 in FIG. 4.

Figure 7:
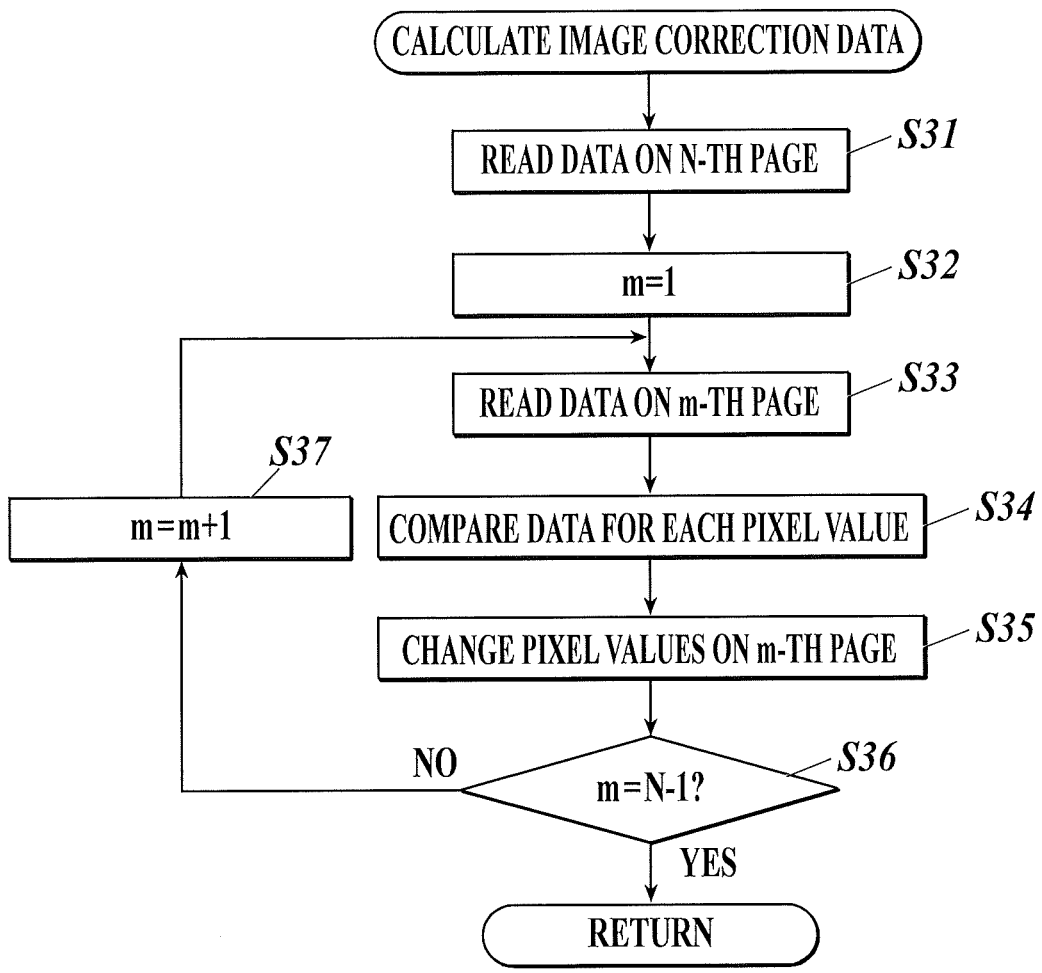
FIG. 7 is a flowchart illustrating an exemplary procedure for calculating image correction data in the learning mode of the embodiment.

FIG. 7 is a flow chart illustrating an exemplary procedure for calculating image correction data in Step S28. The CPU 13 reads the data on the N-th page stored in Step S27 of FIG. 6 in order to calculate correction data (Step S31). The data to be read is image data including the values of respective pixels and the colorimetric result stored in Step S24 of FIG. 6.

The process subsequently sets m=1 (Step S32) and then reads data on an m-th page (Step S33). Similarly to the data on the N-th page, the data to be read is image data including the values of respective pixels and the colorimetric result stored in Step S24 of FIG. 6.

Step S34 then compares the data on the m-th page with the data on the N-th page for each pixel value. More specifically, the process acquires a colorimetric result Ym for a certain pixel value Xm on the m-th page and a pixel value XN involving an identical colorimetric result to Ym on the N-th page.

Step S35 then changes the pixel values in the image data on the m-th page. More specifically, the process replaces the pixel value Xm on the m-th page with the pixel value XN on the N-th page. All pixel values in the image data on the m-th page are subjected to the process. If the N-th page has no pixel value XN involving an identical colorimetric result to Ym for the pixel value Xm on the m-th page, the pixel value Xm is replaced with a pixel value involving the closest colorimetric result.

After the changes in pixel values on the m-th page, Step S36 determines whether m=N−1. If not m=N−1 (Step S36: No), Step S37 sets m=m+1 to return to Step S33. If m=N−1 (Step S36: Yes) after the changes in pixel values on the first to (N−1)-th pages, the process returns to Step S29 of FIG. 6.

As described above, if no image correction data corresponding to the determined conditions is stored, new image correction data is created and stored in the learning mode. More specifically, before the image forming apparatus 20 reaches a steady state, the pixel values on each page are changed so that an appropriate image can be provided and the changed pixel values are stored.

In Step S28, an exemplary step is described which changes the pixel values of image data; alternatively, correction values may be calculated in any appropriate manner other than the changes in pixel values. For example, the correction values may be calculated using the adjustment of the light exposure from the exposure section, the control of the developing bias of the developing section, or the combination thereof.

Figure 8:
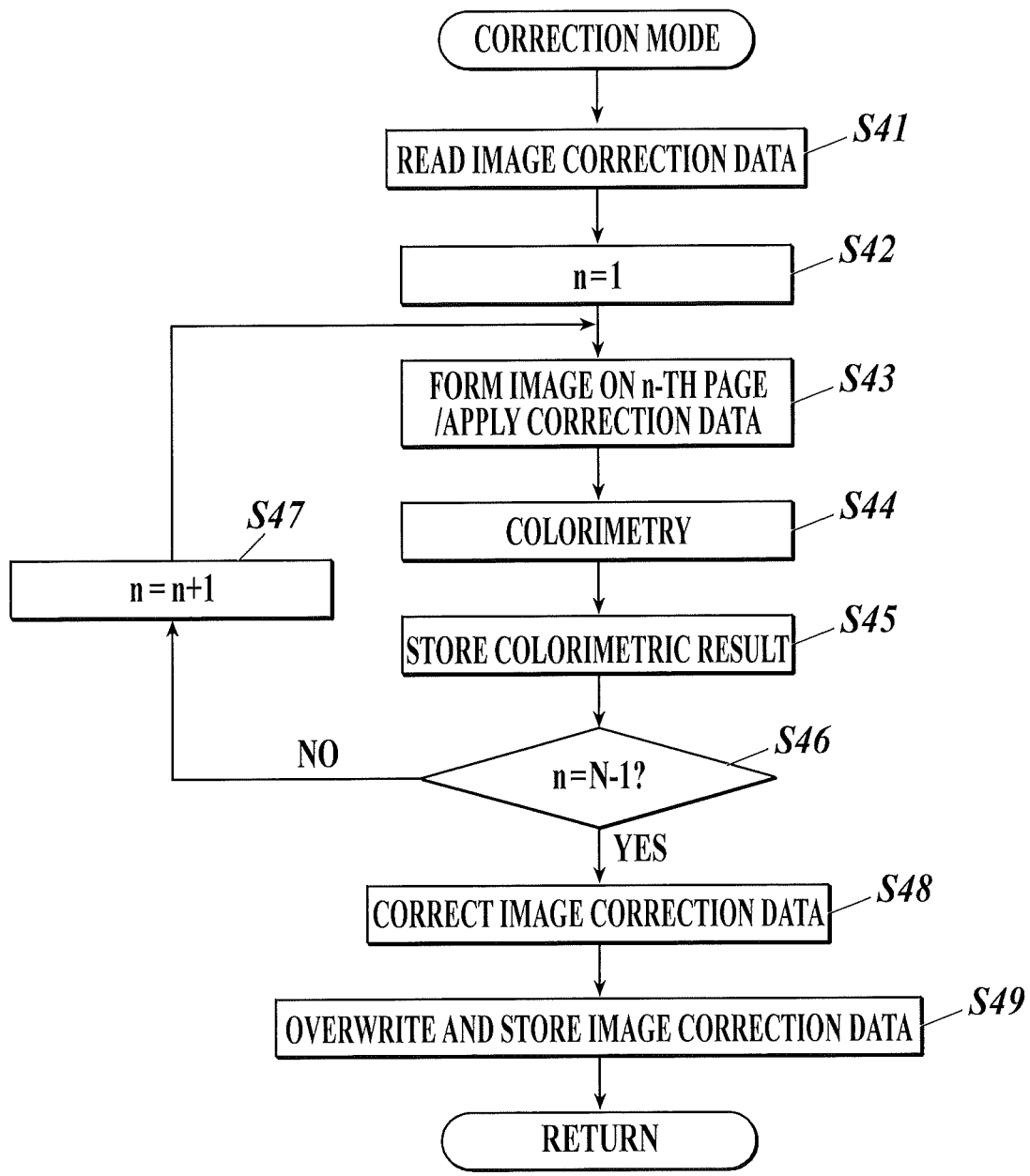
FIG. 8 is a flow chart illustrating an exemplary control procedure in a correction mode of the embodiment.

FIG. 8 is a flow chart illustrating an exemplary procedure during the correction mode illustrated in Step S7 in FIG. 4. Upon the start of the correction mode, the CPU 13 first reads correction data corresponding to the conditions determined in Step S4 (Step S41). Step S42 then sets n=1.

Next, the image forming apparatus 20 forms an image on an n-th page (Step S43). The correction data for the n-th page is selected from the image correction data read in Step S41 to form the image on the n-th page. A sheet having the image formed thereon is conveyed to the colorimeter 80 and is subjected to colorimetry in the colorimetric section 83 (Step S44).

The result measured in the colorimetric section 83 is stored in the RAM 15 or the HDD 16 as a colorimetric result on the n-th page corresponding to the determined conditions (Step S45). After the storing, Step S46 determines whether n=N−1. N is an integer representing a page number at which the image forming apparatus 20 reaches a steady state and is preliminarily stored for each condition. If not n=N−1 (Step S46: No), Step S47 sets n=n+1 to return to Step S43.

In this way, the image correction data preset for every page is applied to the respective pages, i.e., the first page to the (N−1)-th page right before the N-th page at which the image forming apparatus 20 reaches a steady state in order to form the images. If Step S46 determines n=N−1 (Step S46: Yes), image correction data is corrected (Step S48).

Step S48 corrects the image correction data read in Step S41 on the basis of the colorimetric result stored in Step S45. For more specific example, if the colorimetric result stored in Step S45 differs from the preliminarily stored image output in a steady state for each page, image correction data is calculated so as to provide the same image output as the preliminarily stored image output in a steady state. The image correction data read in Step S41 is overwritten with the calculated image correction data for each page (Step S49), and the image correction data is stored.

The process completes the overwriting and then goes to Step S8 in FIG. 4.

According to the control procedure described above, the printer controller 10 controls the image forming apparatus 20 to form an image using the preliminarily stored image correction data, which is preset for each page, for a job based on an image forming instruction.

Since this procedure involves image correction based on the image correction data determined for each page, a desired image output can be provided even if image output varies for each page.

In the present embodiment, image correction data is created on the basis of the colorimetric result from the colorimeter 80 connected to the image forming apparatus 20 and is used to form the images. The image correction data is also updated on the basis of the colorimetric result. This procedure can correct images on the basis of the results of measurement of an image fixed in the fixing unit 34. This process can provide the output of an image satisfying the requirements.

The image, however, may be measured upstream of the fixing unit 34. In other words, the result of measurement of a toner image before the fixing process may be used to create and update the image correction data.

The images may be measured by any means other than the colorimeter provided in the image forming apparatus 20 and the colorimeter connected to the image forming apparatus 20 through online. For example, an external colorimeter may measure an image formed by the image forming apparatus 20, and the colorimetric result may be inputted to the image forming apparatus 20 to create and update the image correction data. In this case, the colorimetric result is inputted to the image forming apparatus 20 in response to an instruction from a user through the operation display 23 or the terminal 60.

In the present embodiment, the image is corrected on the basis of the image correction data for each page in the quiescent state of the image forming apparatus 20. This can provide appropriate image output in the image formation generally involving a large variation in image output for respective pages right after a quiescent state.

Such an image correction based on the image correction data for each page may be executed at any appropriate timing other than right after a quiescent state. In this case, the control procedure excluding Steps S2 and S3 in FIG. 4 may be executed.

In the present embodiment, as illustrated in FIG. 5, multiple conditions, such as the quiescent time of the image forming apparatus 20 and the job condition, are determined, and the image is corrected with appropriate image correction data corresponding to respective conditions. This procedure can provide an appropriate corrected image satisfying various conditions. Alternatively, the identical image correction data may be used at all times without determining image correction data corresponding to each condition.

In the present embodiment, if no image correction data corresponding to the conditions determined in Step S4 of FIG. 4 is stored, the learning mode is executed to create and store image correction data corresponding to the conditions. In this procedure, the image formation for the subsequent image based on the same conditions as those of the previous image formation can be corrected with the image correction data previously stored. As a result, appropriate image output can be provided for the subsequent image formation.

In the present embodiment, the correction data is created during the learning mode on the basis of the colorimetric result obtained before the steady state of the image forming apparatus 20. The steady state may be determined using any appropriate criterion other than that explained in the embodiment. For example, this determination may be based on the first page on which the colorimetric difference between the previous and subsequent images in the portions having the same pixel value falls below a predetermined value, or may be based on the number of a predetermined sheet.

In the present embodiment, different image correction is executed before and after the steady state. Alternatively, such image correction based on the image correction data for each page may be executed independent of the steady state.

The present embodiment determines whether the image forming apparatus reaches the steady state during the correction mode, using the page number N at which the image forming apparatus reaches the steady state during the learning mode. The determination, however, may be based on any other appropriate condition. For example, the image forming apparatus 20 may be determined to be in the steady state when a colorimetric difference measured in the colorimeter 80 between the pages is equal to or less than a predetermined value.

In the present embodiment, the output of a job that has been corrected with the image correction data is also subjected to the colorimetry in the colorimeter 80 to update and store the image correction data on the basis of the colorimetric result. This procedure can appropriately correct the images at any time depending on, for example, the state of the image forming apparatus 20 and can provide appropriate images.

In the present embodiment, the printer controller 10 controls operations of the image forming apparatus 20. The image forming apparatus 20, however, may include the function of the printer controller 10. In addition, the image forming apparatus 20 may include the function of the colorimeter 80.

Any other embodiments different from the above-described embodiment are applicable without departing from the scope and spirit of the present invention.

The entire disclosure of Japanese Patent Application No. 2013-131271 filed on Jun. 24, 2013 including description, claims, drawings, and abstract are incorporated herein by reference in its entirety.

What is claimed is:

1. An image forming apparatus comprising:
  an acquisition unit for independently acquiring image correction information on every page, the image correction information being independently preset for every page on which an image is to be formed and being stored in a storage unit;
  a control unit for correcting an image forming condition for every page based on the image correction information acquired by the acquisition unit and controlling the image forming apparatus to form the image on a sheet based on the corrected image forming condition,
  a quiescent period measuring unit for measuring a period during which the image forming apparatus is in a quiescent state; and
  a determination unit for determining an execution condition for a job according to the period measured by the quiescent period measuring unit,
  wherein when image correction information corresponding to the execution condition for the job determined by the determination unit is not stored in the storage unit, the control unit creates new image correction information corresponding to the execution condition for the job and stores the created new image correction information in the storage unit.

2. The image forming apparatus according to claim 1, further comprising a quiescent state determining unit, wherein the quiescent state determining unit determines whether the image forming apparatus is in a quiescent state before formation of the image on the sheet, and wherein
  the control unit corrects the image forming condition based on the image correction information only when the quiescent state determining unit determines that the image forming apparatus is in the quiescent state.

3. The image forming apparatus according to claim 1, further comprising a steady state determining unit for determining whether the image forming apparatus reaches a steady state where a difference in image forming result between pages is equal to or less than a predetermined value, wherein
  the control unit corrects the image forming condition based on the image correction information before the steady state determining unit determines that the image forming apparatus reaches the steady state.

4. The image forming apparatus according to claim 3, wherein the control unit corrects the image forming condition based on different information from the image correction information after the steady state determining unit determines that the image forming apparatus reaches the steady state.

5. The image forming apparatus according to claim 1, wherein
  the control unit corrects the image forming condition based on the image correction information according to the period measured by the quiescent period measuring unit.

6. The image forming apparatus according to claim 1, wherein the determination unit determines the execution condition for the job according to job information in addition to the measured period.

7. The image forming apparatus according to claim 1, wherein the control unit corrects a pixel value included in image data in order to correct the image forming condition based on the image correction information.

8. The image forming apparatus according to claim 1, further comprising a colorimetric section for performing colorimetry for the image formed on the sheet, wherein
  the control unit creates the image correction information based on a colorimetric result from the colorimetric section; and
  the acquisition unit acquires the image correction information created by the control unit.

9. The image forming apparatus according to claim 1, further comprising a colorimetric section for performing colorimetry for the image formed on the sheet, wherein
  the control unit updates the image correction information based on a colorimetric result from the colorimetry section.

10. An image forming system comprising:
  the image forming apparatus according to claim 1; and
  a colorimeter for performing colorimetry for the image formed on the sheet ejected from the image forming apparatus, the colorimeter being connected to the image forming apparatus, wherein
  the control unit creates the image correction information based on a colorimetric result from the colorimeter; and
  the acquisition unit acquires the image correction information created by the control unit.

11. The image forming system according to claim 10, wherein the control unit updates the image correction information based on the colorimetric result from the colorimeter.

12. A control apparatus for controlling an operation of an image forming apparatus for forming an image on a sheet, comprising:
  an acquisition unit for independently acquiring image correction information on every page, the image correction information being independently preset for every page on which the image is to be formed and being stored in a storage unit;
  a control unit for correcting an image forming condition for every page based on the image correction information acquired by the acquisition unit and controlling the image forming apparatus to form the image on the sheet based on the corrected image forming condition;
  a quiescent period measuring unit for measuring a period during which the image forming apparatus is in a quiescent state; and
  a determination unit for determining an execution condition for a job according to the period measured by the quiescent period measuring unit,
  wherein when image correction information corresponding to the execution condition for the job determined by the determination unit is not stored in the storage unit, the control unit creates new image correction information corresponding to the execution condition for the job and stores the created new image correction information in the storage unit.

13. An image forming system comprising:

the control apparatus according to claim 12; and an image forming apparatus for forming an image on a sheet, the image forming apparatus being controlled by the control apparatus.

* * * * *